United States Patent Office 3,473,230
Patented Oct. 21, 1969

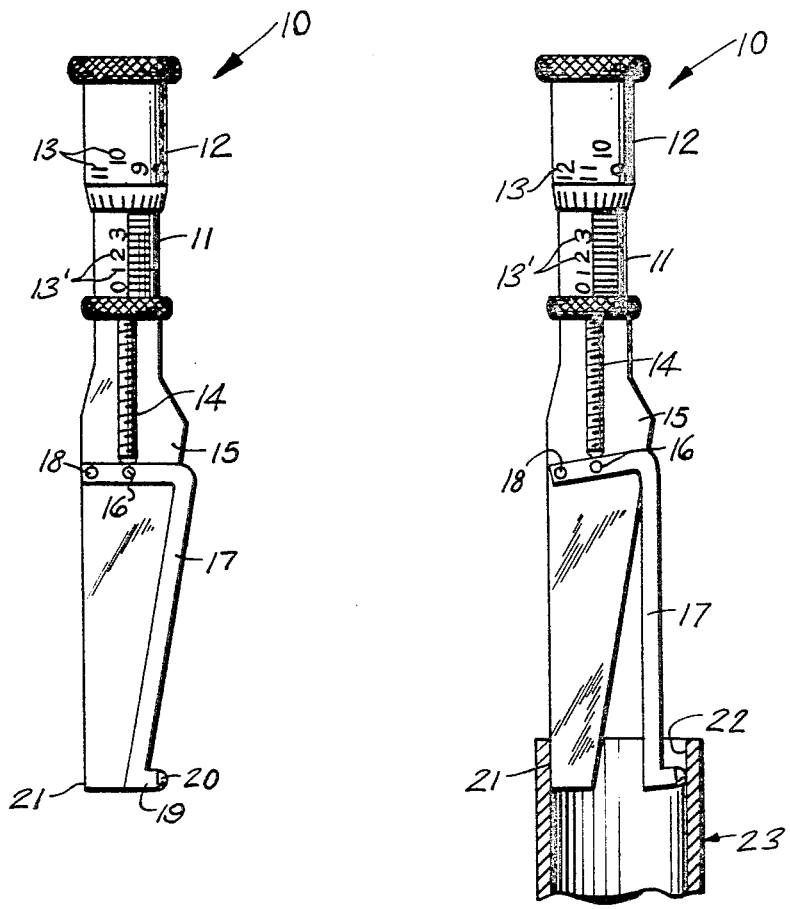

3,473,230
INSIDE MICROMETER
Roy J. Stevens, Alexandria, La.
(5023 Moser Drive, Pineville, La. 71360)
Filed Aug. 14, 1967, Ser. No. 660,394
Int. Cl. B43l 9/16
U.S. Cl. 33—149                                      1 Claim

ABSTRACT OF THE DISCLOSURE

An instrument for measuring in thousandths of an inch straight and tapered bores of cylinders with a thimble, barrel and threaded spindle, the spindle being attached by a ball-joint to a pivotable arm member, the arm member being pivotally secured to a frame, the edge of which in conjunction with the arm member contacting the bore periphery of the cylinder.

---

This invention relates to precision measuring instruments and more particularly to an instrument for precision measurement of inside diameters.

It is therefore the main purpose of this invention to provide an inside micrometer which will accurately measure straight or tapered bores.

Another object of this invention is to provide an inside micrometer which will have a frame member and a pivotable arm attached to the frame member in order to accurately measure the inside diameter of cylinders.

Other objects of the present invention are to provide an inside micrometer which is simple in design, inexpensive to manufacture, rugged in construction, easy to use and efficient in operation.

These and other objects will become readily evident upon a study of the following specification taken in connection with the attached drawing wherein:

FIGURE 1 is a side view of the present invention shown in elevation and in full-closed position;

FIGURE 2 is a side elevation similar to FIGURE 1, but showing the instrument within a cylinder which is shown in section.

According to this invention, an inside micrometer 10 is provided with a cylindrical barrel 11 which is received within a cylindrical thimble 12. Thimble 12 being provided with calibrations 13 and barrel 11 being provided with calibrations 13', thus to measure inside diameters in thousandths of an inch as is well known in the prior art. A threaded spindle 14 extends from the barrel 11 and is parallel with a flat frame 15. The lower extremity of spindle 14 is provided with a ball joint 16 and is secured to arm 17. Arm 17 receives a pivot pin 18 which projects from frame 15. The lower extremity of arm 17 is provided with a rounded end 20 which in conjunction with edge 21 of frame 15 provides a means of measuring the bore 22 of cylinder 23.

In use, micrometer 10 is placed so that the edge 21 of frame 15 and the rounded end 20 of arm 17 are within the bore 22 of cylinder 23. The thimble 12 portion of inside micrometer 10 is then rotated until arm 17 pivots to properly contact the end periphery of cylinder 23 whereupon a reading may be taken by means of the calibrations 13 and 13'. Thus the diameter of the bore 22 is obtained.

What I now claim is:

1. An inside micrometer instrument, comprising in combination, a frame, a cylindrical barrel, said barrel being integrally secured to said frame, said barrel threadingly engaging a thimble over one end thereof, said barrel having an external thread engaging an internal thread of said thimble, said threads allowing axial travel of said thimble along said barrel during rotation of said thimble, said barrel having an axially extending calibrated scale along a cylindrical side thereof, said thimble having a calibrated scale along an edge thereof, said edge of said thimble being aligned with said calibrated scale of said barrel for obtaining a reading, said thimble having a central concentric spindle integral therewith said spindle extending through said barrel, the terminal end of said spindle forming a ball and socket joint with a right angle lever comprising an arm, one end of said arm being attached pivotally free on a pin secured to said frame, said arm being comprised of a pair of legs at right angles to each other, said ball and socket joint being located along an intermediate portion of one of said legs, the other leg having a terminal end which is rounded and in longitudinal alignment with an end edge of said frame for being received within a bore to be measured, said frame and edge and said rounded end of said arm bearing against diametrically opposite inside surfaces of said bore.

References Cited

UNITED STATES PATENTS

| | | |
|---|---|---|
| 646,783 | 4/1900 | Young et al. |
| 725,859 | 4/1903 | Moller. |
| 2,302,355 | 11/1942 | Sumner. |
| 3,114,206 | 12/1963 | Eckert. |

FOREIGN PATENTS 238,859   12/1945   Switzerland.

WILLIAM D. MARTIN, Jr., Primary Examiner

U.S. Cl. X.R.

33—164